Figure 1:
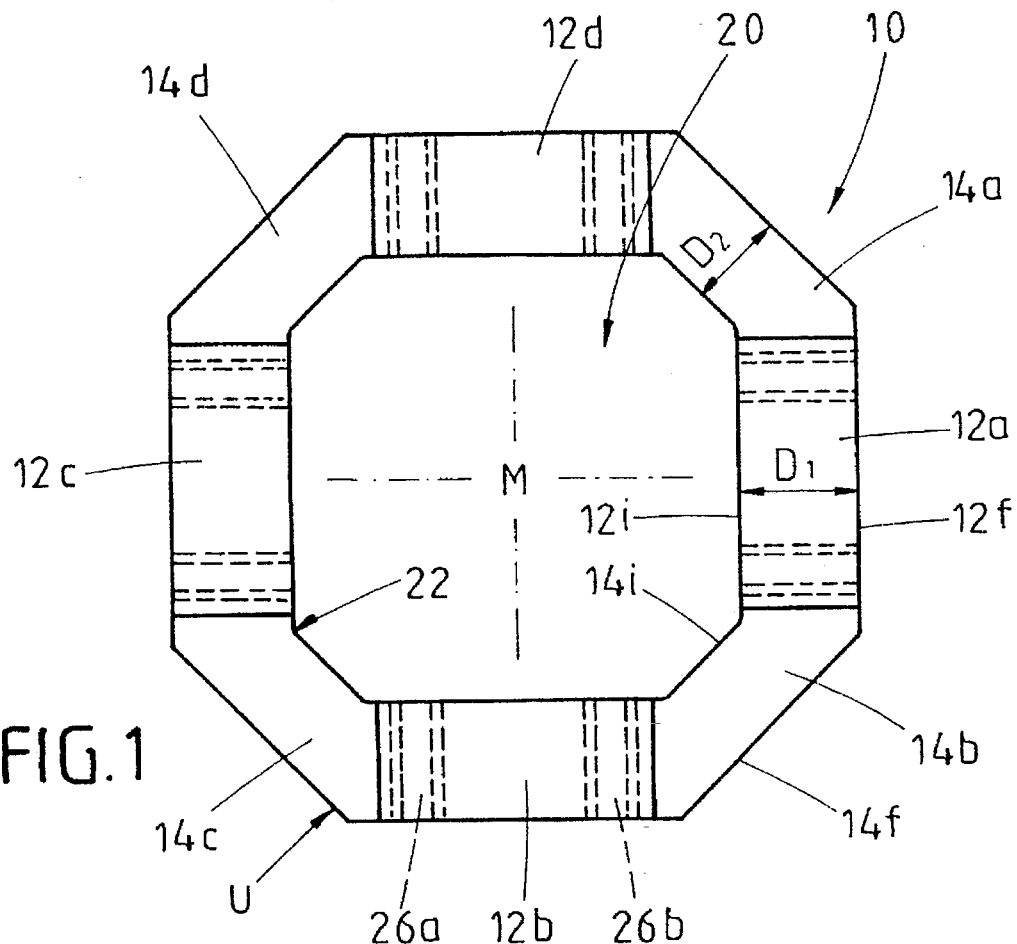

United States Patent [19]

Mögling

[11] Patent Number: 5,634,313
[45] Date of Patent: Jun. 3, 1997

[54] CYLINDRICAL, REFRACTORY, HOLLOW BRICK

[75] Inventor: Gerd Mögling, Vienna, Austria

[73] Assignee: Veitsch-Radex Aktiengesellschaft fur Feuerfeste Erzeugnisse, Vienna, Austria

[21] Appl. No.: 442,489

[22] Filed: May 16, 1995

[30] Foreign Application Priority Data

May 19, 1994 [DE] Germany .................... 44 17 526.4

[51] Int. Cl.[6] ................................ E04C 2/04
[52] U.S. Cl. ................ 52/609; 52/603; 52/604; 52/606; 165/9.1; 165/9.2; 165/9.4
[58] Field of Search .............. 52/596, 603, 604, 52/605, 606, 608, 609; 405/284, 285, 286; 165/9.1, 9.2, 9.3, 9.4; 404/37, 38, 39, 41, 42

[56] References Cited

U.S. PATENT DOCUMENTS

| | | | |
|---|---|---|---|
| 2,157,017 | 5/1939 | Rice | 52/604 X |
| 2,221,416 | 11/1940 | Tau | 52/604 X |
| 4,436,144 | 3/1984 | Horak | 165/9.2 X |
| 4,540,039 | 9/1985 | Karl | 165/9.1 X |
| 4,589,474 | 5/1986 | Horak et al. | 165/9.2 X |
| 4,768,578 | 9/1988 | Sulit | 165/9.4 X |
| 4,997,308 | 3/1991 | Welling, Jr. | 52/603 X |
| 5,513,475 | 5/1996 | Schaf et al. | 52/604 X |

FOREIGN PATENT DOCUMENTS

| | | | |
|---|---|---|---|
| 232170 | 7/1963 | Austria | 52/603 |
| 0093472B1 | 11/1983 | European Pat. Off. | |
| 685842 | 4/1930 | France | 52/603 |
| 2934208C2 | 7/1985 | Germany | |
| 381692B | 11/1986 | Germany | |
| 424462 | 8/1947 | Italy | 52/606 |
| 572928 | 2/1958 | Italy | 52/606 |
| 344813 | 3/1931 | United Kingdom | 52/603 |

*Primary Examiner*—Carl D. Friedman
*Assistant Examiner*—Aimee E. McTigue
*Attorney, Agent, or Firm*—John F. A. Earley; John F. A. Earley, III

[57] ABSTRACT

The invention relates to a cylindrical, refractory, hollow brick having tapered wall surfaces in the corner region.

15 Claims, 2 Drawing Sheets

CYLINDRICAL, REFRACTORY, HOLLOW BRICK

DESCRIPTION

The invention relates to a cylindrical, refractory, hollow brick of the type used for the checker relining of chambers of a glass melting furnace.

Known hollow bricks of said type are described in DE 29 34 208 C2. The bricks have an octagonal external contour and a square central channel with rounded-off corners. To build up a checker relining for a glass melting furnace, the bricks are stacked in offset courses, the rounded-off channel corners of bricks of one plane projecting relative to the corresponding outer corner regions of adjacent bricks of the plane below. The end result is a desired turbulent flow in the channel region.

In EP 0 093 472 A1, said bricks are developed in that the channel diameter and wall thickness of the hollow bricks are to have specific dimensions. A typical wall thickness is given as 40 mm.

In AT 381 692 B it is proposed to design the hollow bricks of a checkerwork—viewed from the bottom upwards—with a progressively smaller overall height and correspondingly to reduce the size of horizontal throughflow openings likewise from the bottom upwards.

With said form of construction, as in the above-mentioned prior art, the wall thickness of the hollow bricks is always constant.

As, for example, FIG. 4 of AT 381 692 B reveals, adjacent bricks of a relining plane do not touch one another; rather, they are a slight distance apart from one another. The illustrated composition of the bricks results from the basic checker structure, according to which a brick of one plane rests on four corresponding part-portions of four bricks of the plane below.

Prismatic hollow bricks of the known type, which are generally known as chimney bricks or chimney blocks, have proved very successful and even today are still widely used.

Nevertheless there is naturally a need further to improve the quality and effectiveness of checker bricks.

In said connection, the invention has recognized that the known build-up of individual, structurally identical hollow bricks into, for example, a checker relining of a regenerative checkerwork of a glass melting furnace has the drawback that the gap remaining between the corner regions of adjacent bricks of a plane is not thermally exploitable. In prior art, said gap was usually about 6 mm. Given such a small gap width, neither radiant nor convection heat may be economically used.

The invention therefore proceeds i.a. from the idea of altering the geometry of the hollow bricks in such a way that corresponding surface portions of adjacent bricks are at a greater distance from one another in order that the gap thus formed may be utilized as an effective heating surface to optimize the efficiency of the checkerwork.

Simply spreading apart the adjacent bricks of a checkerwork plane does not achieve the object since this would entail a corresponding dimensional adaptation of the bricks of the plane above, which on the grounds of profitability alone is not desirable.

Said object may however nevertheless be achieved if the bevelled outer surface, known from prior art, in the corner region of the brick is enlarged, thereby necessarily producing an increase in the size of the gap relative to the adjacent brick (given an otherwise identical arrangement).

Proceeding from the known hollow bricks, this would however lead to an inadequate wall thickness in the corner region of the bricks, which is why an additional inventive idea is aimed at also adapting the internal contour of the brick, i.e. the wall surface of the channel, to the new geometry by flattening the rounded-off corner known from prior art.

By so doing, the wall thickness of the brick in the corner region is admittedly reduced compared to the other portions. Said reduction in the wall thickness is, however, absolutely desirable in order to lower the checkerwork weight without reducing thermal efficiency.

This admittedly leads in the form of construction according to the invention, as will be described in greater detail below, to a reduction in the brick surface in terms of absolute surface area. With regard to the checkerwork as a whole, the thermally usable brick surface is however increased because—as stated—it is now also possible thermally to utilize the outer surfaces in the corner region which previously made virtually no contribution.

In its most general embodiment, the invention relates to a cylindrical, refractory, hollow brick, the peripheral surface of which comprises eight surface portions disposed at an angle to one another, with in each case two diametrically opposed main surfaces extending parallel to one another, and which has a through channel extending coaxially relative to the central longitudinal axis. A hollow brick having said features is known from prior art and is then developed according to the invention by the following features:

- the channel is peripherally delimited by eight surface portions disposed at an angle to one another,
- in each case two diametrically opposed surface portions extend parallel to one another,
- the surface portions internally and externally delimiting each wall region of the hollow brick extend parallel to one another,
- the wall regions in the corners of the hollow brick have a wall thickness which is 15 to 35% less than the remaining, interlying wall regions,
- the hollow brick is fashioned in such a way that upon rotation through 90° about its central longitudinal axis the original geometry is reattained.

Where reference is made to "surface portions", these are understood to be the so-called main surfaces which together produce the external and internal contour of the hollow brick. According to one embodiment, the corresponding surface portions are plane, i.e. flat. It is however also possible for the surfaces to be of a profiled shape or to be connected to one another by rounded-off regions.

Where reference is made to "parallel" surface portions, this includes, particularly in the relation of the surface portions of the channel to the surface portions of the peripheral surface, also such geometries in which, for example, the surface portions of the channel have a slight inclination relative to the vertical for reasons associated with manufacturing technology (pressing technology).

Where the new hollow brick differs crucially from hollow bricks according to prior art is above all in the new geometry of the channel (its surface portions) and particularly in the special construction of the corner regions with a reduced wall thickness compared to the wall regions extending therebetween.

As explained above, the resultant effect is that the hollow bricks of a relining plane are a greater distance apart from one another than in prior art so as to form, between the corner regions of adjacent hollow bricks of a relining plane, an enlarged gap which provides two new, energy-efficient heating surfaces and hence characteristically improves the thermal efficiency of the checkerwork as a whole.

It has emerged that the optimum gap width between adjacent corner regions of two hollow bricks of a relining plane is preferably 20 to 30 mm, ideally about 25 mm.

On the basis of standard sizes of hollow bricks of the type described, this is achieved by reducing the wall thickness in the corner region by 20 to 22% compared to the other wall regions.

This results, for example, in the following dimensions:

distance between the outer surfaces of two opposing wall regions outside of the corner region: 218 mm+/–2 mm distance between two outer surfaces of opposing corner wall regions: 228 mm+/–2 mm wall thickness outside of the corner regions: 38 mm+/–2 mm wall thickness in the corner regions: 30 mm+/–1 mm distance between two inner surfaces of opposing wall regions outside of the corners: 142 mm+/–2 mm.

The wall regions in the corners may, like the wall regions with a greater wall thickness, have recesses which preferably extend from the bottom surface of the hollow brick. Recesses with an archway profile (rounded-off top edge) have proved advantageous both from a production engineering and a heat technology standpoint.

To build up a checkerwork, the bricks are arranged in the described manner in offset courses one above the other. In order to optimize the connection of hollow bricks disposed one above the other, it is therefore proposed that the wall regions in the corners and/or the wall regions having a greater wall thickness have on their top surface raised portions for positively receiving the corresponding recesses. Naturally, said raised portions should not engage fully into the recesses; rather, the recesses are intended to ensure a horizontal transverse flow between adjacent hollow bricks, for which reason it is proposed to limit the height of the raised portions (viewed in the direction of the central longitudinal axis of the brick) to at most 20% of the height of the recesses.

A further optimization of the thermal efficiency arises when the recesses at the bottom surface have a width which is greater than their maximum height (viewed in the direction of the central longitudinal axis).

Furthermore, the recesses at the bottom surface may have a width which is 80% or more of the width of the associated wall surface.

In said manner, the brick height as a whole may be reduced compared to known forms of construction.

Further features of the invention emerge from the features of the sub-claims and from the other application documents.

The invention is described in greater detail below with reference to an embodiment.

The drawings show—in each case, diagrammatically

FIG. 1: a plan view of a hollow brick according to the invention

Figure 2:
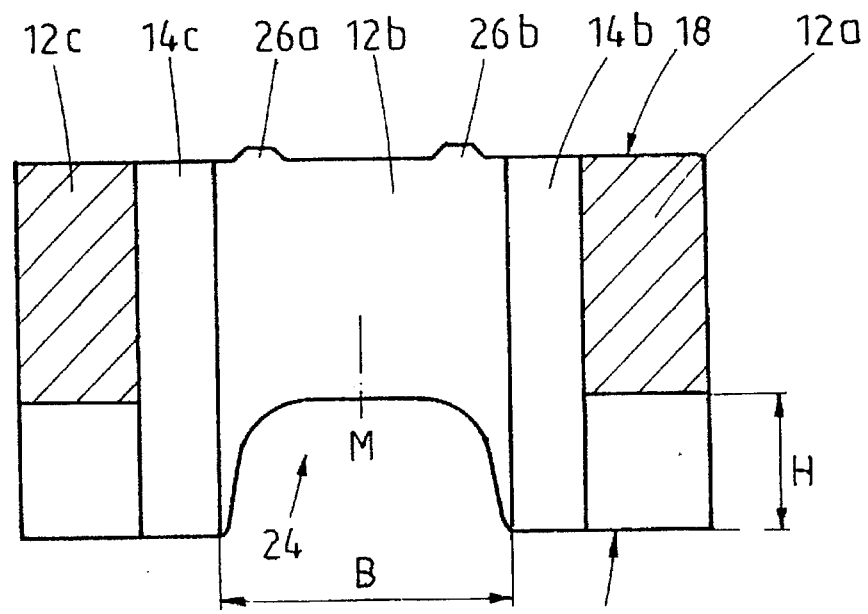

FIG. 2: a side view of the hollow brick according to FIG. 1

Figure 3:
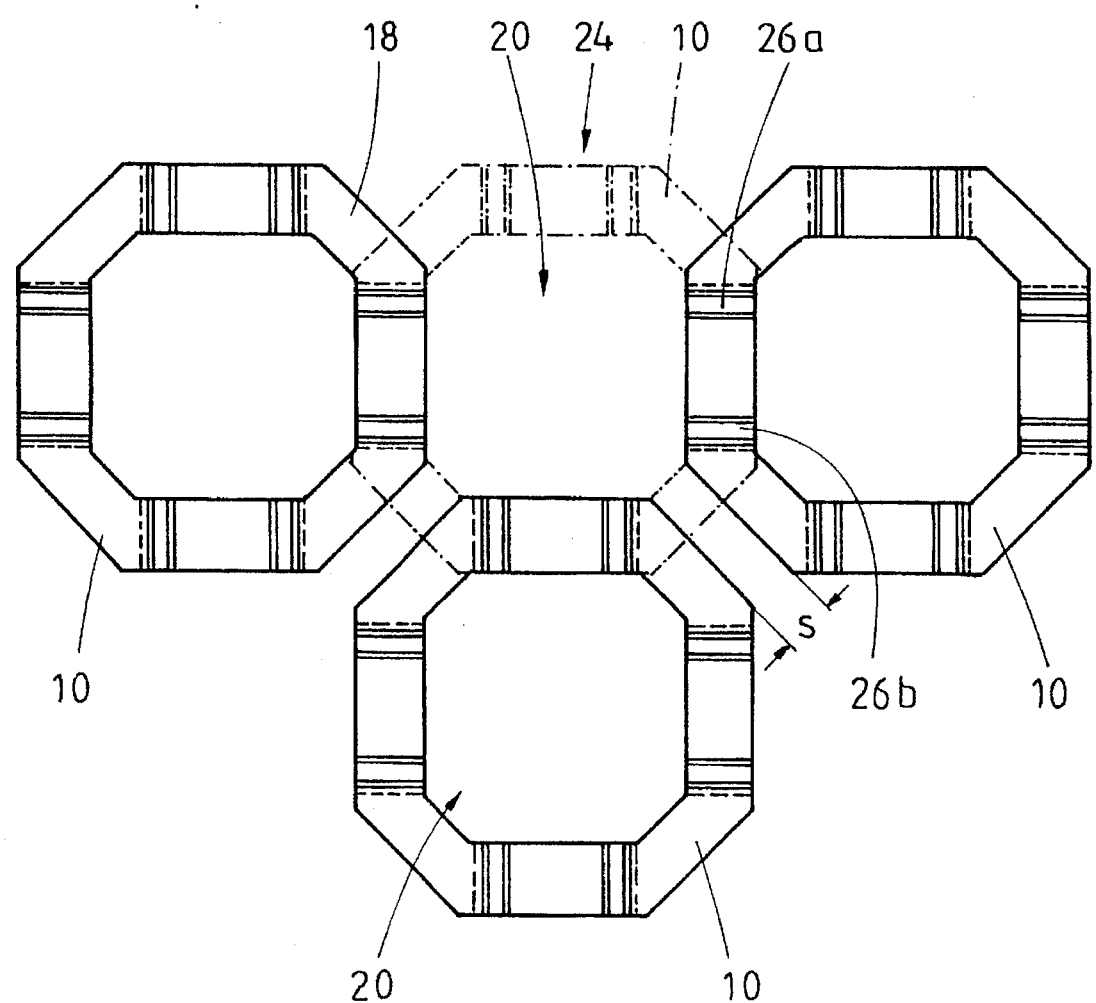

FIG. 3: the plan view of a course of a checkerwork of hollow bricks according to FIGS. 1 and 2.

In FIGS. 1 and 2, the hollow brick as a whole is denoted by the reference numeral 10. It comprises a total of eight wall regions 12a–d and 14a–d, the wall regions 14a–d forming the so-called corner regions.

The wall regions 12a–d each have an outer surface portion 12f and, parallel thereto, an inner surface portion 12i.

In a corresponding manner, the wall regions 14a–d are delimited externally by a surface portion 14f and internally by a parallel surface portion 14i.

The lower end face (bottom surface) bears the reference numeral 16 and the upper end face (top surface) the reference numeral 18.

While the surface portions 12f, 14f are connected alternately to one another and together form the peripheral surface U of the hollow brick 10, the alternately connected, inner surface portions 12i, 14i delimit a channel 20 which is coaxial with the central longitudinal axis M of the hollow brick 10.

As FIG. 1 particularly reveals, the inner surface portions 12i, 14i are connected to one another by slightly curved wall portions 22, while the outer surface portions 12f, 14f verge into one another so as to form, in each case, an angle.

FIG. 1 clearly shows that the wall thickness D1 of the wall regions 12a–e is plainly greater than the wall thickness D2 in the region of the wall regions 14a–d. Whereas D1 is, for example, 38 mm, the wall thickness D2 is limited to 30 mm. Given a checkerwork construction according to FIG. 3, the result is a distance between adjacent outer surface portions 14f of the corner wall regions 14a–d of about 25 to 26 mm.

Thus, by means of the surface portions 14f a—compared to the prior art—new, thermally usable outer surface of the hollow brick 10 is provided and a convection flow is likewise developed in the gaps S between adjacent hollow bricks 10.

The wall regions 12a–d are constructed at their underside with recesses 24 and at their top side with in each case two corresponding raised portions 26a, b, which extend parallel to one another between the outer surface portion 12f and the inner surface portion 12i. The distance between the outer boundary surfaces of the raised portions 26a, b is so selected that, when a recess 24 of a hollow brick 10 of the next relining plane is placed on top, a positive connection is achieved between the raised portions 26a, b and the recess 24.

As FIG. 2 in particular reveals, the width B of the recess 24 in the region of the bottom surface 16 is only slightly smaller than the width of the associated wall region 12b and the height H of the recess 24 is clearly smaller than the width B.

The corner wall regions 14a–d are fashioned here without recesses or raised portions.

FIG. 3 shows in detail how the hollow bricks 10 of a relining plane are disposed relative to one another (simultaneously forming the described gaps S) and also shows (using dashed lines) a hollow brick 10 of an above-lying relining plane, which brick clearly rests on four wall regions of four hollow bricks 10 of the relining plane below, the recesses 24 in the wall regions 12a–d of the hollow brick 10 shown by dashed lines being received and positioned on the corresponding raised portions 26a, b of the top surface 18 of the associated hollow bricks 10 of the relining plane below.

I claim:

1. Cylindrical, refractory, hollow brick, the peripheral surface (U) of which extends between a top surface (18) and a bottom surface (16) and comprises eight external surface portions (12f, 14f) disposed at an angle to one another, with in each case two diametrically opposed surface portions (12f, 12f; 14f, 14f) extending parallel to one another, having a central longitudinal axis and a through channel (20) extending coaxially relative to the central longitudinal axis (M), characterized by the following features:

the channel (20) is peripherally delimited by eight internal surface portions (12i, 14i) disposed at an angle to one another, in each case two diametrically opposed surface portions (12*i*, 12*i*; 14*i*, 14*i*) extend parallel to one another, the hollow brick (10) comprises corner wall regions (14*a–d*) connected together by interlying wall regions (12*a–d*), each wall region being externally delimited by one of the eight external surface portions and internally delimited by one of the eight internal surface portions, the external surface portion for each region being parallel to the internal surface portion of the region;

the corner wall regions (14*a–d*) have a wall thickness (D2) which is 15 to 35% less than the interlying wall regions (12*a–d*);

the hollow brick (10) is fashioned in such a way that upon rotation through 90° about the central longitudinal axis (M) the original geometry is reattained.

2. Hollow brick according to claim 1, in which the corner wall regions (14*a–d*) have a wall thickness which is 20 to 22% less than the interlying wall regions (12*a–d*).

3. Hollow brick according to claim 1, in which the corner wall regions (14*a–d*) have a wall thickness of 30 mm+/−5 mm.

4. Hollow brick according to claim 1, in which the surface portions (12*f*, 14*f*, 12*i*, 14*i*) are flat.

5. Hollow brick according to claim 1, the surface portions (12*i*, 14*i*) connecting at connecting regions, said connecting regions (22) of the surface portions (12*i*, 14*i*) of the channel (20) having a rounded-off construction.

6. Hollow brick according to claim 1, in which the corner wall regions (14*a–d*) are constructed with recesses.

7. Hollow brick according to claim 6, in which the recesses (24) extend from the bottom surface (16) of the hollow brick (10).

8. Hollow brick according to claim 7, in which the recesses (24) have an archway profile.

9. Hollow brick according to claim 7, in which the corner wall region (14*a–d*) have on their top surface (18) raised portions for positively receiving the corresponding recesses.

10. Hollow brick according to claim 9, in which the height of the raised portions (26*a*, 26*b*) (viewed in a direction of the central longitudinal axis (M)) is at most 20% of the height (H) of the recesses (24).

11. Hollow brick according to claim 7, in which the interlying wall regions (12*a–d*) having a greater wall thickness (d1) have on their top surface (18) raised portions (26*a*, 26*b*) for positively receiving the corresponding recesses (24).

12. Hollow brick according to claim 6, in which the recesses (24) at the bottom surface (16) have a width (B) which is greater than their maximum height (H), viewed in a direction of the central longitudinal axis (M).

13. Hollow brick according to claim 12, in which the recesses (24) at the bottom surface (16) have a width (B) which is at least 80% of the width of the associated outer surface (12*f*).

14. Hollow brick according to claim 1, in which the interlying wall regions (12*a–d*) having a greater wall thickness (d1) are constructed with recesses (24).

15. Cylindrical, refractory, hollow brick, the peripheral surface (U) of which extends between a top surface (18) and a bottom surface (16) and comprises eight external surface portions (12*f*, 14*f*) disposed at an angle to one another, with in each case two diametrically opposed surface portions (12*f*, 12*f*; 14*f*, 14*f*) extending parallel to one another, having a central longitudinal axis and a through channel (20) extending coaxially relative to the central longitudinal axis (M), characterized by the following features:

the channel (20) is peripherally delimited by eight internal surface portions (12*i*, 14*i*) disposed at an angle to one another;

in each case two diametrically opposed surface portions (12*i*, 12*i*; 14*i*, 14*i*) extend parallel to one another;

the hollow brick (10) comprises corner wall regions (14*a–d*) connected together by interlying wall regions (12*a–d*), each wall region being externally delimited by one of the eight external surface portions and internally delimited by one of the eight internal surface portions, the external surface portion for each region being parallel to the internal surface portion of the region;

the corner wall regions (14*a–d*) have a wall thickness (D2) which is 15 to 35% less than the interlying wall regions (12*a–d*);

the hollow brick (10) is fashioned in such a way that upon rotation through 90° about the central longitudinal axis (M) the original geometry is reattained;

in which the corner wall regions (14*a–d*) have a wall thickness which is 20 to 22% less than the interlying other wall regions (12*a–d*);

in which the corner wall regions (14*a–d*) have a wall thickness of 30 mm+/−5 mm;

in which the surface portions (12*f*, 14*f*, 12*i*, 14*i*) are flat;

in which the surface portions (12*i*, 14*i*) are connected at connecting regions (22), the connecting regions (22) of the surface portion (12*i*, 14*i*) of the channel (20) having a rounded-off construction;

in which the corner wall regions (14*a–d*) are constructed with recesses;

in which the interlying wall regions (12*a–d*) having a greater wall thickness (d1) are constructed with recesses (24), in which the recesses (24) extend from the bottom surface (16) of the hollow brick (10);

in which the recesses (24) have an archway profile;

in which the corner wall regions (14*a–d*) have on their top surface (18) raised portions for positively receiving the corresponding recesses;

in which the interlying wall regions (12*a–d*) having a greater wall thickness (d1) have on their top surface (18) raised portions (26*a*, 26*b*) for positively receiving the corresponding recesses (24), in which the height of the raised portions (26*a*, 26*b*) (viewed in a direction of the central longitudinal axis (M)) is at the most 20% of the height (H) of the recesses (24);

in which the recesses (24) at the bottom surface (16) have a width (B) which is greater than their maximum height (H), viewed in a direction of the central longitudinal axis (M); and in which the recesses (24) at the bottom surface (16) have a width (B) which is at least 80% of the width of the associated outer surface (12*f*).

* * * * *